(12) United States Patent
Ucan

(10) Patent No.: US 7,259,365 B2
(45) Date of Patent: Aug. 21, 2007

(54) DEVICE FOR SUPPLYING WITH ELECTRIC ENERGY A SENSOR THAT HAS A HIGH ELECTRIC POTENTIAL

(75) Inventor: Aydin Ucan, Ludwigsburg (DE)

(73) Assignee: Eisenmann Lacktechnik GmbH & Co. KG, Boeblingen (DE)

( * ) Notice: Subject to any disclaimer, the term of this patent is extended or adjusted under 35 U.S.C. 154(b) by 0 days.

(21) Appl. No.: 10/520,304

(22) PCT Filed: Jun. 18, 2003

(86) PCT No.: PCT/EP03/06399

§ 371 (c)(1),
(2), (4) Date: Sep. 14, 2005

(87) PCT Pub. No.: WO2004/009246

PCT Pub. Date: Jan. 29, 2004

(65) Prior Publication Data

US 2006/0119850 A1    Jun. 8, 2006

(30) Foreign Application Priority Data

Jul. 20, 2002    (DE)  ................................ 102 33 005

(51) Int. Cl.
*H01L 31/00*    (2006.01)
(52) U.S. Cl. .................................... 250/214.1; 250/221
(58) Field of Classification Search ................ 250/221, 250/222.1, 214.1, 227.24, 203.4
See application file for complete search history.

(56) References Cited

U.S. PATENT DOCUMENTS

| 5,847,389 A | 12/1998 | Mertins et al. |
| 6,093,926 A * | 7/2000 | Mertins et al. ........... 250/222.1 |
| 2001/0045512 A1 | 11/2001 | Brent |

FOREIGN PATENT DOCUMENTS

| DE | 12 33 779 B | 2/1967 |
| DE | 30 02 206 C2 | 12/1987 |
| DE | 199 37 474 A1 | 3/2001 |
| EP | 0 888 825 A2 | 1/1999 |
| EP | 0 888 825 A3 | 8/1999 |
| EP | 1 319 439 A | 6/2003 |

* cited by examiner

*Primary Examiner*—Que T. Le
(74) *Attorney, Agent, or Firm*—Factor & Lake, Ltd.

(57) ABSTRACT

The invention relates to a device for supplying with electric energy a sensor that has a high electric potential and that is used in an enameling line. Said device comprises a light source (1) that has a low electric potential, especially earth potential. Said light source (1) is linked, via an optical waveguide (4), with a light receiver (2) in which a converter (3) is disposed which converts the optical energy to electric energy. The light receiver (2) has the same high potential as the sensor and supplies the latter with the electric energy obtained from the light. This is preferably done via an accumulator (8) that is continuously recharged with the power generated by the converter (3). The invention allows therefore for a practically unlimited service life of sensors in enameling lines.

20 Claims, 1 Drawing Sheet

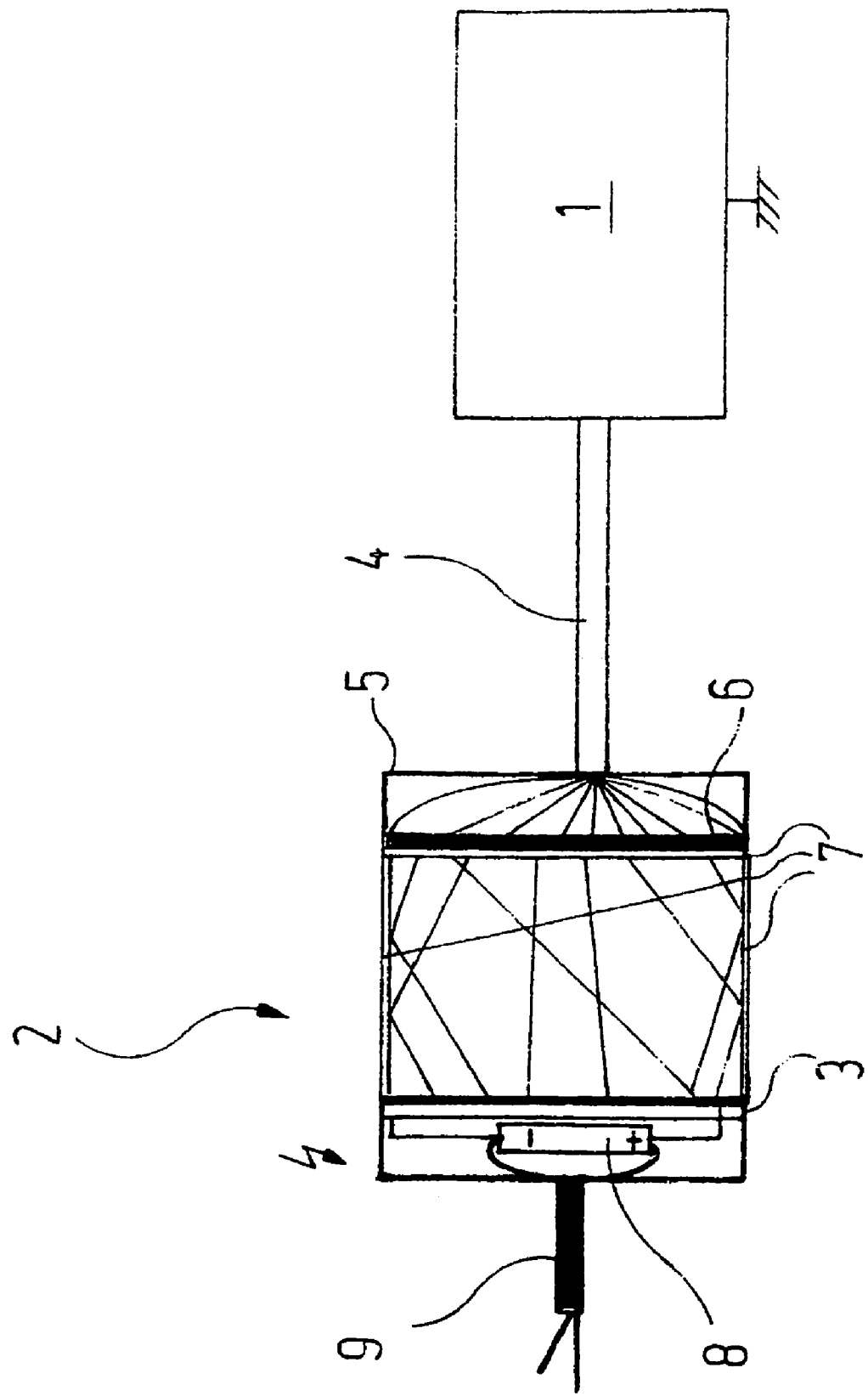

DEVICE FOR SUPPLYING WITH ELECTRIC ENERGY A SENSOR THAT HAS A HIGH ELECTRIC POTENTIAL

RELATED APPLICATIONS

This application claims the filing benefit of PCT Patent Application PCT/EP2003/06399, filed Jun. 18, 2003; and German Patent Application No. 102 33 005.0, filed Jul. 20, 2002 the contents of which are incorporated herein by reference.

TECHNICAL FIELD

The invention relates to device for supplying electrical energy to a sensor which is at a high electrical voltage in a painting system.

BACKGROUND OF THE INVENTION

In modern painting systems, increased use is being made of applicator devices which employ a high-voltage electrode to ionise the paint being sprayed by them, so that it is drawn by electrostatic forces onto the objects to be coated, which are generally at the earth potential. In such painting systems, there is often a need for sensors which are at the same high electrical potential as the applicator device itself. An example of such a sensor is a detector which establishes whether a shuttle responsible for transporting the paint to the applicator device is present in the shuttle station next to the applicator device. These sensors, which in general operate electrically, require an electrical power supply. This, however, presents difficulties owing to the high potential of the sensors.

In known painting systems with electrical sensors which are at a high potential, the latter are supplied from batteries. These, however, have only a short service life so that the operation of the painting system has to be interrupted frequently in order to replace the batteries.

SUMMARY OF THE INVENTION

It is an object of the present invention to provide a device of the type mentioned in the introduction, with which the painting system can be operated for a long time without interruption for maintenance.

This object is achieved according to the invention in that the device comprises:
a) a light source which is at a low electrical potential, in particular the earth potential;
b) a light receiver in which a converter converting light energy into electrical energy is provided, which is electrically connected to the sensor and is at the high potential of the sensor;
c) an optical waveguide which connects the light source to the light receiver.

According to the invention, the energy source from which the sensor is supplied is thus a light source which—since it is DC isolated from the components carrying high voltage—can be at a low potential. In the light receiver, the light which has been delivered is converted back into electrical energy which can be used to operate the sensor.

The converter is expediently a solar cell; such solar cells are now available inexpensively and have a comparatively good electrical efficiency.

The optical waveguide may be formed by a bundle of optical fibres. In this way, it also has a high efficiency.

The use of optical waveguides which are formed by a bundle of optical fibres makes it possible to employ a configuration of the invention in which the light receiver has a housing in which is a transparent plate, into which the ends of the fibres of the optical waveguide are fed, is arranged in the vicinity of a side wall, all the internal surfaces of the housing which the light emerging from the transparent plate can reach being provided with a reflective layer. This configuration of the invention makes do without imaging elements. A flat light source is produced with the aid of the individual fibres of the optical waveguide and the transparent plate, into which the fibre ends are fitted. The light emerging from it is reflected by the reflective inner walls of the housing of the light receiver until it finally reaches the solar cell and is converted into electrical energy.

The transparent plate is expediently a plastic plate, which can be readily processed mechanically in order to receive the fibre ends.

For reasons of cost, it is recommendable for the reflective layer on the inner walls of the housing of the light receiver to consist of aluminium foil.

Alternatively, the light receiver may contain a converging lens by which the light emerging from the end face of the optical waveguide is essentially collimated and thus guided onto the converter. In this case as well, the converter is illuminated extensively and substantially homogeneously with light, which improves the conversion efficiency.

A more particularly preferred embodiment of the invention is one in which an accumulator is provided, which is constantly charged by the voltage being generated by the converter. The sensor is thus supplied only indirectly from the electrical energy which is generated by the converter, that is to say via the energy-storing accumulator. This makes it possible to achieve more consistent operating conditions for the sensor; the accumulator is virtually always fully charged so that it has a very long life.

BRIEF DESCRIPTION OF THE DRAWING

The invention will be explained in more detail below with reference to the drawing. The single FIGURE schematically shows a device for supplying a sensor of a painting system, which is at a high electrical potential.

DETAILED DESCRIPTION OF THE PRESENT INVENTION

The main components of the device as represented are a light source 1, which is connected to a light receiver 2 via an optical waveguide 4 made up of individual optical fibres. The light receiver 2 has a housing 5, in which a transparent or optionally translucent plastic plate 6 is fitted parallel to the side face through which the optical waveguide 4 passes. The plastic plate 6 extends over the entire cross section of the housing 5. The ends of the fibres of the optical waveguide 4 are spread apart and fastened in the transparent plate 6 with a distribution which is as uniform as possible.

Opposite the transparent plate 6 and likewise next to a side face of the housing 5, the housing 5 contains a solar cell 3 used as an electrical converter. The solar cell 3 also extends over the entire cross section of the housing 5. The inner walls of the housing 5 between the transparent plate 6 and the solar cell 3 are covered with reflective aluminium foil 7.

An accumulator 8 and a charging circuit (not shown in the drawing) are arranged in the space between the solar cell 3 and the side face of the housing 5 adjacent to the solar cell 3. The charging circuit is supplied with the output voltage of the solar cell 3; it converts this output voltage in known fashion, and constantly charges the accumulator 8 so that it is always approximately fully charged. The accumulator 8 is in turn connected to the sensor (not shown in the drawing) via a cable 9.

Owing to the DC connection via the cable 9, the light receiver 2 is at the same high electrical potential as the sensor; the light source 1 is at the earth potential.

The device as described above functions in the following way:

Through the optical waveguide 4, the light source 1 operated with electrical energy transmits light which is spread out to form a flat light source using the individual optical fibres and the plastic plate 6. After a variable number of reflections, the light radiated by this flat light source reaches the solar cell 3 which converts the light into electrical energy. This is used by the charging circuit in order to recharge the accumulator 8. The electrical energy drawn off via the cable 9 in order to supply the sensor is thus continuously replaced in the accumulator 8 by the electrical energy obtained from the light of the light source 1. Since the accumulator 8 is constantly fully charged, its service life is extraordinary long. The device can therefore be operated for a very long time without having to carry out maintenance work on the electrical power supply of the sensor.

The invention claimed is:

1. A device for supplying electrical energy to a sensor which is at a high electrical voltage in painting systems, the device comprising:
   a light source which is at a low electrical potential substantially equal to the earth's electrical potential;
   a light receiver in which a converter converting light energy into electrical energy is provided, which is electrically connected to the sensor and is at the high potential of the sensor; and,
   an optical waveguide which connects the light source to the light receiver.

2. The device of claim 1, wherein the converter is a solar cell.

3. The device of claim 1, wherein the optical waveguide is formed by a bundle of optical fibres.

4. The device of claim 3, wherein the light receiver has a housing in which is a transparent plate, into which the ends of the fibres of the optical waveguide are fed, is arranged in the vicinity of a side wall, all the internal surfaces of the housing which the light emerging from the transparent plate can reach being provided with a reflective layer.

5. The device of claim 4 wherein the transparent plate is a plastic plate.

6. The device of claim 5, wherein the reflective layer consists of aluminum foil.

7. The device of claim 1, wherein the light receiver contains a converging lens by which the light emerging from the end face of the optical waveguide is essentially collimated and thus guided onto the converter.

8. The device of claim 1 further comprising an accumulator which is constantly charged by the voltage being generated by the converter.

9. The device of claim 2, wherein the optical waveguide is formed by a bundle of optical fibres.

10. The device of claim 9, wherein the light receiver has a housing in which is a transparent plate, into which the ends of the fibres of the optical waveguide are fed, is arranged in the vicinity of a side wall, all the internal surfaces of the housing which the light emerging from the transparent plate can reach being provided with a reflective layer.

11. The device of claim 10 wherein the transparent plate is a plastic plate.

12. The device of claim 11, wherein the reflective layer consists of aluminum foil.

13. The device of claim 4, wherein the reflective layer consists of aluminum foil.

14. The device of claim 2, wherein the light receiver contains a converging lens by which the light emerging from the end face of the optical waveguide is essentially collimated and thus guided onto the converter.

15. The device of claim 3, wherein the light receiver contains a converging lens by which the light emerging from the end face of the optical waveguide is essentially collimated and thus guided onto the converter.

16. The device of claim 9, wherein the light receiver contains a converging lens by which the light emerging from the end face of the optical waveguide is essentially collimated and thus guided onto the converter.

17. The device of claim 2 further comprising an accumulator which is constantly charged by the voltage being generated by the converter.

18. The device of claim 3 further comprising an accumulator which is constantly charged by the voltage being generated by the converter.

19. device of claim 4 further comprising an accumulator which is constantly charged by the voltage being generated by the converter.

20. The device of claim 6 further comprising an accumulator which is constantly charged by the voltage being generated by the converter.

\* \* \* \* \*